N. HISS AND F. D. POTTER.
PROCESS OF AND APPARATUS FOR CONVEYING MOTOR VEHICLES THROUGH TUNNELS AND KEEPING TUNNELS FREE FROM NOXIOUS GASES.
APPLICATION FILED SEPT. 16, 1920.
1,361,583.
Patented Dec. 7, 1920.
2 SHEETS—SHEET 1.
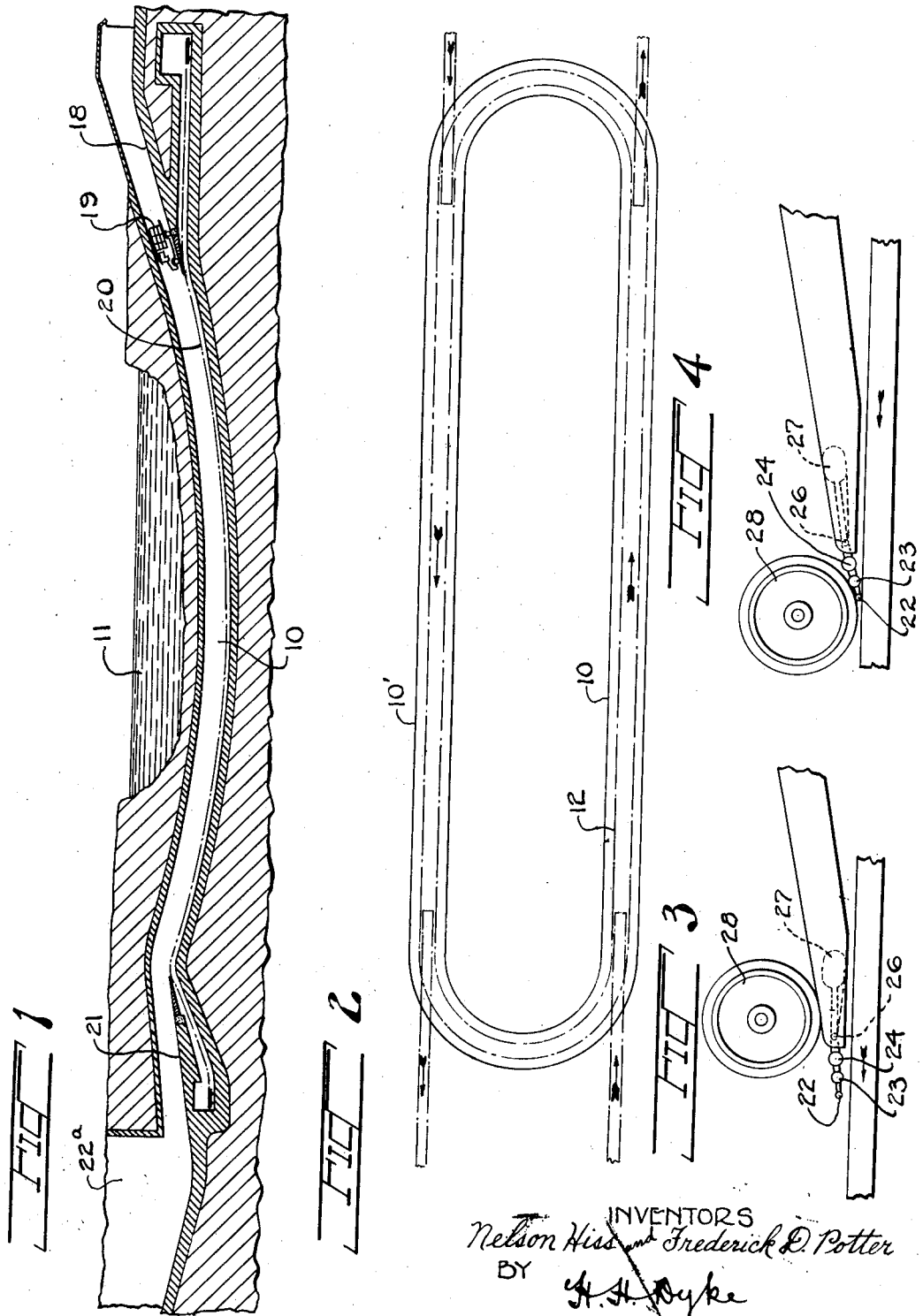

N. HISS AND F. D. POTTER.
PROCESS OF AND APPARATUS FOR CONVEYING MOTOR VEHICLES THROUGH TUNNELS AND KEEPING TUNNELS FREE FROM NOXIOUS GASES.
APPLICATION FILED SEPT. 16, 1920.
1,361,583.
Patented Dec. 7, 1920.
2 SHEETS—SHEET 2.
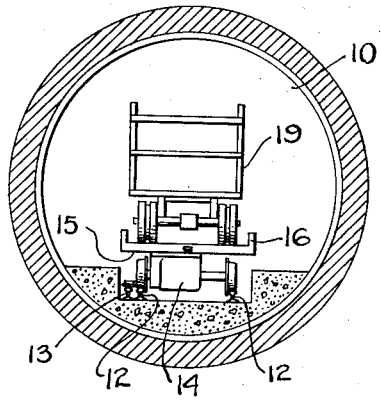
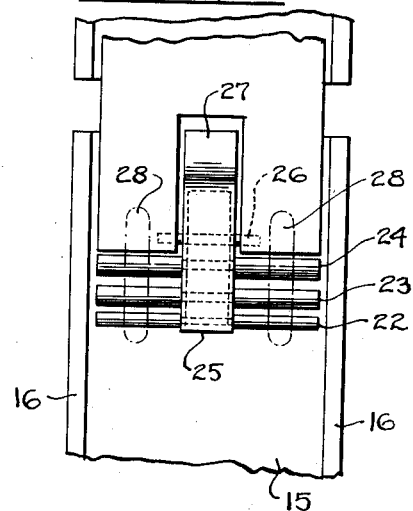
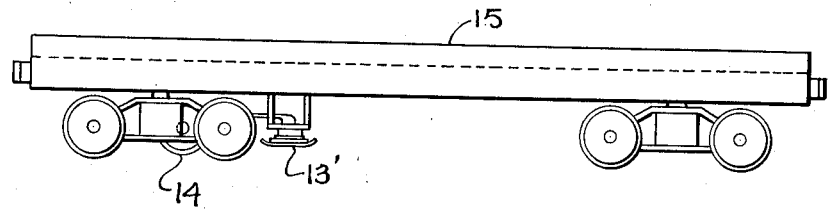
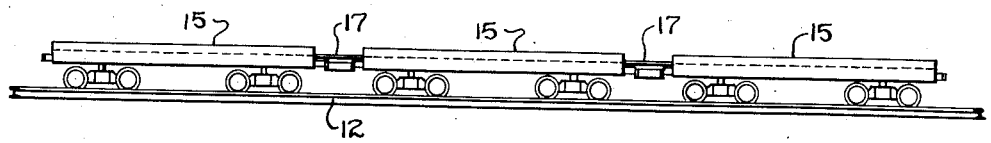
INVENTORS
Nelson Hiss and Frederick D. Potter.
BY H. H. Dyke
ATTORNEY

UNITED STATES PATENT OFFICE.

NELSON HISS, OF NEW YORK, N. Y., AND FREDERICK D. POTTER, OF LINDEN, NEW JERSEY.

PROCESS OF AND APPARATUS FOR CONVEYING MOTOR-VEHICLES THROUGH TUNNELS AND KEEPING TUNNELS FREE FROM NOXIOUS GASES.

1,361,583.  Specification of Letters Patent.  Patented Dec. 7, 1920.

Application filed September 16, 1920. Serial No. 410,776.

*To all whom it may concern:*

Be it known that we, NELSON HISS and FREDERICK D. POTTER, citizens of the United States, and residents, respectively, of the borough of Manhattan, city, county, and State of New York, and Linden, county of Union, and State of New Jersey, have invented a new and useful Improvement in Processes of and Apparatus for Conveying Motor-Vehicles Through Tunnels and Keeping Tunnels Free from Noxious Gases, of which the following is a specification.

Our invention relates to a proces of and apparatus for conveying motor vehicles through tunnels with their motors out of operation, by means of power supplied from outside sources, whereby the tunnels are kept free from noxious gases produced by running the motor vehicles through under their own power.

It is now being proposed to construct vehicular tunnels of considerable length under the Hudson River and the Delaware River, through which motor vehicles are to be operated under their own power, provision being made for the removal of the noxious exhaust gases by means of a ventilating system.

The deadly character of the exhaust gases of internal combustion engines is well known, and the safety of such tunnels is dependent entirely upon the certainty of operation of the ventilating system whereby such deadly gases and fumes are continuously removed and fresh air supplied.

If the ventilating system fails even for a short time, the inevitable result would be the extinction of all human and other life within the tunnel, so that a tunnel so constructed and operated would be at all times under the shadow of impending disaster which would speedily result from any breaking down, stopping or other failure of the ventilating system in operation.

Our invention provides means for conveying motor vehicles through tunnels with their engines shut off and out of use, thus avoiding all danger from noxious gases. The power is supplied from an outside source, as a power house.

According to our invention the motor vehicles are conveyed through the tunnels upon a conveyer made up of a plurality of cars or trucks arranged adjacent to one another in a continuous series and run through the tunnel on tracks proviked for this purpose. Preferably each of these cars or trucks is supplied with its own electric motor, so as to provide efficiently for the continuous operation of the apparatus.

An incline is provided at the entering end, down which the motor vehicles may run freely after their engines have been stopped and with their gears in neutral.

At the exit end a second downward incline is preferably provided, upon which the motor vehicles are discharged from the moving platform or conveyer, while the trucks making up the conveyer travel on in an endless succession, re-traversing a second tunnel, or branch of the tunnel, in an opposite direction, and having similar loading and discharging inclines, thus providing for the flow of traffic in both directions simultaneously.

In the drawing forming a part of this specification, Figure 1 is a sectional view of a tunnel provided with a conveyer for motor vehicles in accordance with our invention. Fig. 2 is a diagrammatic plan view. Fig. 3 is a detail view, showing a wheel of a motor vehicle about to pass from the entrance incline to the conveyer. Fig. 4 is a similar view showing a wheel of a motor vehicle passing upon the conveyer. Fig. 5 is a sectional view of a tunnel, with a conveyer in place therein and a motor vehicle thereon. Fig. 6 is a detail plan view of the roller platform over which motor vehicles pass from the conveyer to the inclines and vice versa. Fig. 7 is a side view of one of the motor cars or trucks of which the conveyer is made up, and Fig. 8 is a similar view of a plurality of the trucks or cars.

The tunnels 10 and 10' are arranged substantially parallel to one another, and preferably at a distance of several hundred feet apart, and serve to avoid any natural obstacle such as a bay or river 11, a hill or mountain, etc.

Tracks 12 are laid in the tunnels, making a continuous loop, having substantially the form of an ellipse.

A third rail 13 may be provided for supplying electric current for the motors 14 of the cars or trucks 15 by means of shoes 13'. In addition to the principal central switch at the central power station or elsewhere, auxiliary switches are preferably provided at each of the inclines to be used to stop the conveyer in case of accident or emergency. The cars or trucks 15 are of the flat car type and have side ledges 16 with renewable steel strips or treads for the motor vehicles to run on, and plates 17 of steel are provided to extend from car to car of the series thereby making the conveyer substantially continuous, without break between the cars.

Downwardly extending inclines are provided at the entering end over which the motor vehicles 19 may descend by gravity with their engines shut off and not running, and be delivered to the conveyer, which is designated generally by the reference numeral 20.

At the discharge ends of the tunnel the motor vehicles are discharged upon downwardly extending inclines 21, to the open air at 22ᵃ where the motors can be started and the vehicles proceed under their own power. Extended plazas or parking spaces (not shown) may be provided at the ends of the tunnels, as will be readily understood.

Fig. 1 shows the arrangement of conveyer and inclines for travel in one tunnel in one direction, and the arrangement in the other tunnel is merely reversed from that shown in Fig. 1, to provide for the movement of traffic in opposite directions.

At the ends of the inclines a series of rollers is preferably provided, over which the wheels of the motor vehicles pass from the inclines to the conveyer, and vice versa. In the form shown, a plurality of rollers 22, 23 and 24 is provided, of gradually increasing diameter, and the same are mounted to rotate in a frame 25. This frame is pivoted in the incline at 26 and provided with a counterweight 27. The counterweight 27 serves to keep frame 25 and the rollers mounted thereon normally elevated and to prevent same from bearing on the surface of the conveyer so that when a wheel 28 of a motor vehicle 19 passes thereover, the frame and rollers are depressed, as shown in Fig. 4, thus providing an easy transition substantially free from shock, from the conveyer to the incline, and vice versa.

It will be seen that in addition to the primary advantage of rendering tunnels free from noxious gases, and the dangers incident thereto, the apparatus as described has other important advantages. Traffic is not impeded by slow moving vehicles, so that the capacity of the tunnel is increased. There is no necessity for having one line of slow moving and another line for more rapidly moving vehicles, as all move with the conveyer at the same rate of speed. With the motors distributed throughout the cars or trucks of the conveyer, control is made simple and easy, it being possible to take care of the control of the entire system from one central point. If desired, for the passage of a number of teams and wagons, for example, the speed of the conveyer can be suitably reduced from that possible in conveying motor vehicles, and the conveyer may even be stopped and wagons or motor vehicles run by their own power over the surface of the conveyer as a roadway.

We claim:

1. The process of conveying motor vehicles through tunnels, which comprises running same with their engines stopped down an incline upon a conveyer, conveying them through the tunnel upon the conveyer and down an incline before their engines are re-started.

2. The process of conveying motor vehicles through parallel tunnels, which consists in providing an endless conveyer extending through the tunnels in opposite directions, delivering motor vehicles thereto, with their engines stopped, conveying same through the tunnels, and delivering the same down an incline before the engines are re-started.

3. The process of conveying motor vehicles through tunnels, which consists in running same with their engines stopped upon a conveyer extending through the tunnel, conveying same through the tunnel upon said conveyer, and discharging same from the conveyer at the end of the tunnel before their engines are re-started, whereby the tunnel is kept substantially free from noxious gases.

4. A tunnel for motor vehicles, a moving platform conveyer for motor vehicles extending therethrough, an incline at one end of the tunnel extending down to the conveyer, and an incline at the other end of the tunnel extending downwardly from the conveyer.

5. A two branch tunnel for motor vehicles, an endless conveyer for motor vehicles extending through said branches in opposite directions, inclines leading downwardly to said conveyer at the incoming ends, and inclines leading downwardly from said conveyer at the outgoing ends of the tunnels.

6. A vehicular tunnel, a conveyer for vehicles therein, an incline adjacent thereto, a frame pivoted at the end of the incline, a series of rollers on said frame beyond the end of the incline and adapted when depressed to rest upon the conveyer, and a counterweight for said frame to normally raise said rollers above the conveyer.

In witness whereof we have signed our names hereto.

NELSON HISS.
FREDERICK D. POTTER.